United States Patent
Yamasaki

(10) Patent No.: US 8,027,046 B2
(45) Date of Patent: Sep. 27, 2011

(54) IMAGE PROCESSING APPARATUS, CONTROL APPARATUS THEREOF, AND IMAGE PROCESSING SYSTEM THAT MANAGES COMPONENT POWER INDIVIDUALLY

(75) Inventor: Shinichi Yamasaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1255 days.

(21) Appl. No.: 11/707,923

(22) Filed: Feb. 20, 2007

(65) Prior Publication Data

US 2007/0277048 A1    Nov. 29, 2007

(30) Foreign Application Priority Data

Mar. 29, 2006  (JP) ................. 2006-090230

(51) Int. Cl.
*G06F 1/30* (2006.01)
*G06F 1/32* (2006.01)
*G03G 15/00* (2006.01)
*G06F 15/00* (2006.01)
*G06F 3/12* (2006.01)

(52) U.S. Cl. ...... 358/1.14; 358/1.15; 713/300; 713/310; 713/320; 713/323; 713/324; 713/330; 713/340; 399/37; 399/88; 399/89; 399/90

(58) Field of Classification Search .............. 713/300, 713/310, 320, 323, 324, 330, 340; 358/1.14, 358/1.15; 399/37, 88, 89, 90
See application file for complete search history.

(56) References Cited

U.S. PATENT DOCUMENTS

| | | | |
|---|---|---|---|
| 5,937,148 A | 8/1999 | Okazawa et al. | |
| 6,459,496 B1 | 10/2002 | Okazawa et al. | |
| 6,785,012 B2 | 8/2004 | Okazawa et al. | |
| 6,950,953 B2 | 9/2005 | Kizawa et al. | |
| 2002/0149789 A1 | 10/2002 | Okazawa | |
| 2002/0171861 A1 | 11/2002 | Katsuragi | |
| 2003/0140260 A1 | 7/2003 | Kizawa et al. | |
| 2003/0163747 A1* | 8/2003 | Yoshikawa | 713/323 |
| 2004/0175200 A1* | 9/2004 | Namura | 399/88 |
| 2005/0102442 A1* | 5/2005 | Ferlitsch | 710/15 |
| 2005/0128515 A1* | 6/2005 | Ohno | 358/1.15 |

FOREIGN PATENT DOCUMENTS

| | | |
|---|---|---|
| JP | 8-101606 A | 4/1996 |
| JP | 2001-016221 A | 1/2001 |
| JP | 2001-016222 A | 1/2001 |
| JP | 2001-075687 A | 3/2001 |
| JP | 2002-344673 A | 11/2002 |
| JP | 2003-63101 A | 3/2003 |
| JP | 2003-078672 A | 3/2003 |
| JP | 2003-078673 A | 3/2003 |
| JP | 2005-186425 | 7/2005 |

* cited by examiner

*Primary Examiner* — Twyler Haskins
*Assistant Examiner* — Fred Guillermety
(74) *Attorney, Agent, or Firm* — Birch, Stewart, Kolasch & Birch, LLP

(57) ABSTRACT

A control apparatus connected to the plurality of image processing apparatuses by way of a network judges whether to apply current to a data processing unit held by the image processing apparatus based on a predetermined current application judging rule and transmits a result of judgment to the image processing apparatus. Each image processing apparatus, in the case of receiving the result of judgment of whether to apply current to the data processing unit through a NIC from the control apparatus, controls a current application state of the data processing unit based on the result of judgment. The data processing unit is divided in a plurality of functional blocks, and the current application to the data processing unit is controlled, functional block by functional block.

1 Claim, 6 Drawing Sheets

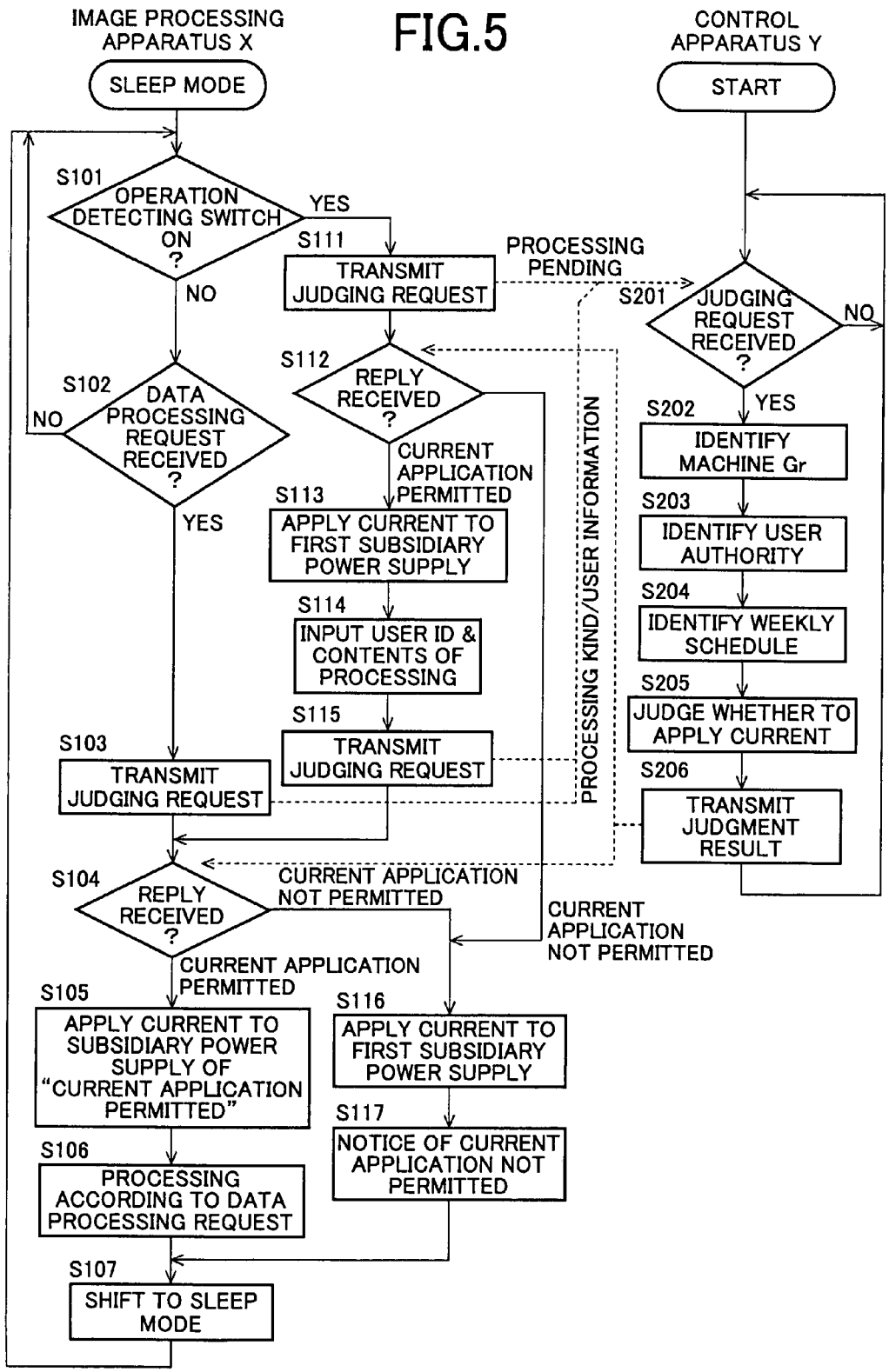

FIG.6

WEEKLY SCHEDULE

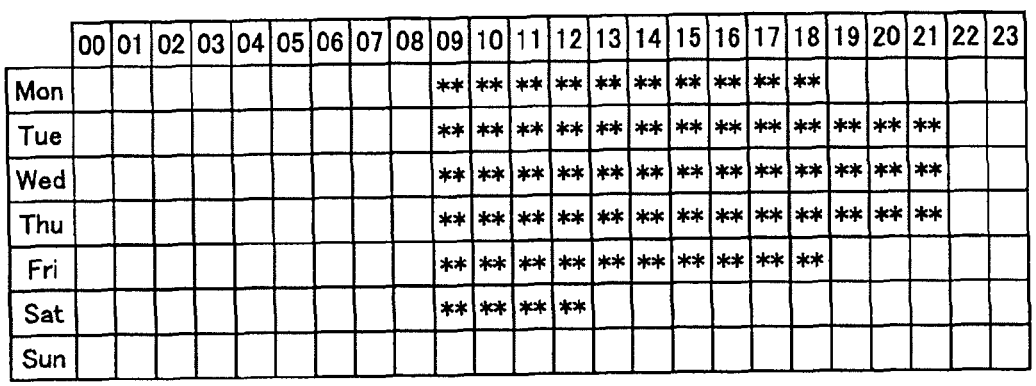

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | | | | | | | | | | ** | ** | ** | ** | ** | ** | ** | ** | ** | ** | | | | | |
| Tue | | | | | | | | | | ** | ** | ** | ** | ** | ** | ** | ** | ** | ** | ** | ** | ** | | |
| Wed | | | | | | | | | | ** | ** | ** | ** | ** | ** | ** | ** | ** | ** | ** | ** | | | |
| Thu | | | | | | | | | | ** | ** | ** | ** | ** | ** | ** | ** | ** | ** | ** | ** | ** | | |
| Fri | | | | | | | | | | ** | ** | ** | ** | ** | ** | ** | ** | ** | | | | | | |
| Sat | | | | | | | | | | ** | ** | ** | ** | | | | | | | | | | | |
| Sun | | | | | | | | | | | | | | | | | | | | | | | | |

FIG.7

PROCESSING KIND/FUNCTIONAL BLOCK CORRESPONDENCE TABLE — Tb1

| KIND OF DATA PROCESSING | SC | PR | PR&TR | DF | PENDING |
|---|---|---|---|---|---|
| FIRST SUBSIDIARY POWER SUPPLY (RELATED TO MAIN CONTROL UNIT) | ON | ON | ON | ON | ON |
| SECOND & SIXTH SUBSIDIARY POWER SUPPLIES (RELATED TO SCANNER) | ON | OFF | OFF | OFF | OFF |
| THIRD, SEVENTH, & EIGHTH SUBSIDIARY POWER SUPPLIES (RELATED TO PRINT UNIT) | OFF | ON | ON | OFF | OFF |
| FOURTH & NINTH SUBSIDIARY POWER SUPPLIES (RELATED TO POST-PROCESSING UNIT AND EXTRAS | OFF | OFF | ON | OFF | OFF |
| FIFTH SUBSIDIARY POWER SUPPLY | ON | ON | ON | ON | OFF |

IMAGE PROCESSING APPARATUS, CONTROL APPARATUS THEREOF, AND IMAGE PROCESSING SYSTEM THAT MANAGES COMPONENT POWER INDIVIDUALLY

CROSS-NOTING PARAGRAPH

This Non-provisional application claims priority under 35 U.S.C. §119(a) on Patent Application No. 2006-090230 filed in JAPAN on Mar. 29, 2006, the entire contents of which are hereby incorporated herein by reference.

FIELD OF THE INVENTION

The present invention relates to an image processing apparatus equipped with a communicating unit of communicating with external apparatuses, and a control apparatus thereof, and an image processing system comprising the image processing apparatus and the control apparatus thereof, and, in particular, is an invention preferred for electric power saving.

BACKGROUND OF THE INVENTION

In general, an image processing apparatus, such as a multifunctional peripheral (MFP) including a printer, scanner, facsimile machine, and copier or functions thereof, includes a communicating unit (such as a NIC (Network Interface Card) or modem (Modulator-Demodulator)) that communicates with an external apparatus (such as a computer or other image processing apparatuses) through a communication medium such as a network or telephone lines. Some of such image processing apparatuses include a function (hereinafter, a sleep function) for shifting to a power saving state (generally, referred to as a sleep mode) with lower power consumption than a normal operation state (hereinafter, an operating state) if no operation is performed for an operation input unit included in the image processing apparatus and no data are received from the external apparatus through the communicating unit for a certain time period or more. In the power saving state, for example, energization (power supply) is discontinued for a fixing device including a heater and devices such as a control circuit, while the communicating unit is often maintained in an energized state. This is because in the power saving state, energization of devices in a non-energized state is resumed automatically in response to a request from the external apparatus to allow the devices to automatically return to the operating state. For example, in an image forming apparatus shown in Japanese Laid-Open Patent Publication No. H8(1996)-101606, when an energized communicating unit receives a print request in a power saving state, the entire apparatus is applied with current to form an image in accordance with the received print request.

The requests from the external apparatuses include various requests such as a print request that requests to form an image on a recording paper sheet, an image scan request that requests to read an image formed on a document, and a request for performing processing of accessing a storage unit such as a hard disk included in the image processing apparatus to manipulate a data file (hereinafter, a data filing processing). The data filing processing may be processing of writing or updating data, reading data, erasing data, and changing data file names, for example.

On the other hand, in an image forming apparatus shown in Japanese Laid-Open Patent Publication No. 2005-186425, when an energized controller receives an access request for a hard disk from an external apparatus through a network in a power saving state, energization of the hard disk is started to perform the requested processing.

In an MFP shown in Japanese Laid-Open Patent Publication No. 2003-63101, when a print request is received through an external interface in a power saving state where a sub-CPU and the external interface are supplied with electric power from a subsidiary power supply, the sub-CPU supplies electric power to a main CPU controlling the entire apparatus to perform printing.

However, when a number of image processing apparatuses held by corporations, etc., individually have a function of setting a condition of shifting to a power saving state and a condition of returning from the power saving state, there has been a problem that a work of setting these conditions individually at these apparatuses is burdensome and at the same time, overall power saving control is hard to achieve.

There has also been a problem that when an apparatus, while in the power saving state, is requested to perform some processing by an external apparatus through a communicating unit or by an operation to a predetermined operation unit, constantly responding to such request by starting application of current to many devices not current-applied and executing the requested processing do not sufficiently achieve sufficient electric power saving.

Furthermore, there has been a problem that when, in a situation where each of many image processing apparatuses is in a power saving state, judgment is made of whether to return to an operating state depending on the situation such as contents of the incoming request for processing, each of many image processing apparatuses, even in the power saving state, must keep a calculating device of making various kinds of judgment in a current-applied state, and sufficient power saving can not be achieved.

SUMMARY OF THE INVENTION

The object of the present invention is to provide an image processing apparatus, a control apparatus thereof, and an image processing system comprising the image processing apparatus and the control apparatus thereof that, when a plurality of image processing apparatuses exist, can facilitate power saving control of them all and can also restrain power consumption of them all.

The present invention provides an image processing apparatus equipped with a communicating unit of communicating with external apparatuses including a predetermined control apparatus (an apparatus controlling application of current to the image processing apparatus) and has a characteristic configuration shown in (A1) and (A2) below:

(A1) a current application switching unit of switching between application and non-application of current to a data processing unit, which is a part or group of parts regarding data processing that is held by the image processing apparatus. Conceivable as the data processing unit are, for example, a scanner unit that reads an image from a document, a print unit that forms the image on recording paper, a post-processing unit that performs processing of punching or stapling to the recording paper, a unit that performs data filing processing, etc.

(A2) a current application controlling unit of controlling a state of the current application to the data processing unit by controlling the current application switching unit based on a result of judgment of whether to apply current to the data processing unit when such result of judgment is received through the communicating unit from the control apparatus.

If a plurality of image processing apparatuses having such configuration are connected by way of a network to the control apparatus controlling these apparatuses, the control of the application of current to the data processing unit (a part that consumes great power in the image processing apparatus) held by each of the plurality of image processing apparatuses can be collectively controlled by the control apparatus.

It will be further preferable to equip the image processing apparatus with the configuration shown in (A3) and (A4) below:

(A3) a current application judging requesting unit of transmitting a request for judging whether to apply current to the data processing unit to the control apparatus through the communicating unit when a request to start the data processing unit is received while the data processing unit is in a non-current-applied state.

(A4) the current application controlling unit of setting the data processing unit in a current-applied state by controlling the current application switching unit when a reply of current application permitted is received through the communicating unit from the control apparatus in response to transmission of the request for judging whether to apply current.

If a plurality of image processing apparatuses having such configuration are connected by way of the network to the control apparatus, an operation of returning from a power saving state (in which the data processing unit is in the non-current-applied state) to an operating state can be controlled by the control apparatus depending on the situation such as contents of a request for processing, with respect to each image processing apparatus.

Furthermore, each image processing apparatus, while in the power saving state, is not required to keep in the current-applied state a calculating device of judging whether to return to the operating state depending on the situation.

Either one of the following two methods is conceivable as the method whereby the current application judging requesting unit receives the request to start the data processing unit. One is the method of receiving the request to start the data processing unit through an operation to a predetermined operation unit provided at least in the image processing apparatus. The other is the method of receiving the request to start the data processing unit through the communicating unit from the external apparatuses at least other than the control apparatus.

It is conceivable that, when the request to start is a data processing request calling for the data processing unit to execute data processing, the request for judging whether to apply current includes information indicating the kind of the data processing request.

It is also conceivable that the image processing apparatus is equipped with a self identifying information storing unit of storing information by which apparatus identifies itself (hereinafter, self identifying information) and the request for judging whether to apply current includes the self identifying information.

It is also conceivable that the image processing apparatus is equipped with a user identifying information acquiring unit of acquiring user identifying information that identifies a user who requests the starting of the data processing unit and the request for judging whether to apply current includes the user identifying information acquired by the user identifying information acquiring unit.

If the image processing information has the above configuration, the control apparatus can use the information indicating the kind of data processing request, the self identifying information, and the user identifying information for judging whether to start the data processing unit.

It is further preferable that the image processing apparatus has the following configuration.

Namely, the data processing unit is divided into a plurality of functional blocks, each of which is a part or a group of parts corresponding to functions. Additionally, the current application switching unit is configured to be capable of switching between application and non-application of current individually to each of the functional blocks. Furthermore, the current application control unit, by controlling thus configured current application switching unit, sets the functional block for which the reply of current application permitted is received from the control apparatus in the current-applied state.

By this configuration, the control apparatus can control so that, when each image processing apparatus is in the power saving state, only a minimally required functional block is set in the current-applied state, depending on the situation.

It is preferable that the image processing apparatus is equipped with a current application not permitted notifying unit of notifying, when a reply of current application not permitted is received through the communicating unit from the control apparatus in response to the transmission of the request for judging whether to apply current, to that effect through a predetermined display unit.

By this, the user who requested the image processing apparatus to execute the data processing (who requested the starting of the data processing unit) can confirm that the request has not been accepted.

If the communicating unit is commonly configured as a part or whole of a constituent element of the current application control unit, the number of constituent elements can be further reduced that must be kept in the current-applied state while the image processing apparatus is in the power saving state.

The present invention can be considered to represent such control apparatus of the image processing apparatus that is configured to be capable of communicating with each of the plurality of image processing apparatuses described above and is equipped with the constituent elements described in (B1) and (B2) below:

(B1) a current application judging unit of judging whether to apply current to the data processing unit held by the image processing apparatus based on a predetermined current application judging rule.

(B2) a judgment result transmitting unit of transmitting a result of judgment by the current application judging unit to the image processing apparatus.

The control apparatus having such configuration can collectively control the current application state of the data processing unit held by each of the plurality of image processing apparatuses.

Furthermore, it is conceivable that the control apparatus is equipped with either one or both of the constituent elements indicated in (B3) and (B4) below:

(B3) a control apparatus-led judging controlling unit of causing the judgment of whether to apply current by the current application judging unit and the transmission of the result of judgment by the judgment result transmitting unit to be autonomously executed in the control apparatus.

(B4) an image processing apparatus-led judging controlling unit of causing the judgment of whether to apply current by the current application judging unit and the transmission of the result of judgment by the judgment result transmitting unit to be executed, when the request for judging whether to apply current to the data processing unit held by the image processing apparatus is received from the image processing apparatus.

If the current application judging rule to be used in the current application judging unit is the rule for judging whether to apply current to the data processing unit based on one or more of pieces of information shown in (1) to (4) below, the control apparatus can flexibly judge whether to apply current depending on various situations.
(1) present time
(2) identifying information of the image processing apparatus
(3) user identifying information identifying the user who requests the starting of the data processing unit that is included in the request for judging whether to apply current
(4) information indicating the kind of data processing to be executed by the data processing unit that is included in the request for judging whether to apply current When the data processing unit in the image processing apparatus is divided into a plurality of functional blocks, each of which is a part or a group of parts corresponding to functions, it is further preferable that the current application judging rule is the rule for judging whether to apply current to functional blocks making up the data processing unit, functional block by functional block.

By this, the control apparatus can control so that only minimally required functional block or blocks may be in the current-applied state.

The present invention can be considered to represent an image processing system comprising a plurality of the image processing apparatuses described above according to the present invention and the control apparatus that can communicate with each thereof.

BRIEF DESCRIPTION OF THE DRAWINGS

FIG. 5 is a flow chart of a procedure of image processing apparatus-led current application judging control processing in the image processing system Z;

FIG. 6 is a schematic view of a weekly schedule representing a current application judging rule of the image processing apparatus in the control apparatus Y;

FIG. 7 is a schematic view of data configuration of a processing kind/functional block correspondence table representing correspondence between the kind of data processing and functional blocks to which current application is permitted.

PREFERRED EMBODIMENTS OF THE INVENTION

Embodiments of the present invention will now be described with reference to the accompanying drawings for understanding of the present invention. The following embodiments are an embodied example of the present invention and do not have the nature of limiting the technical scope of the present invention.

Figure 1:
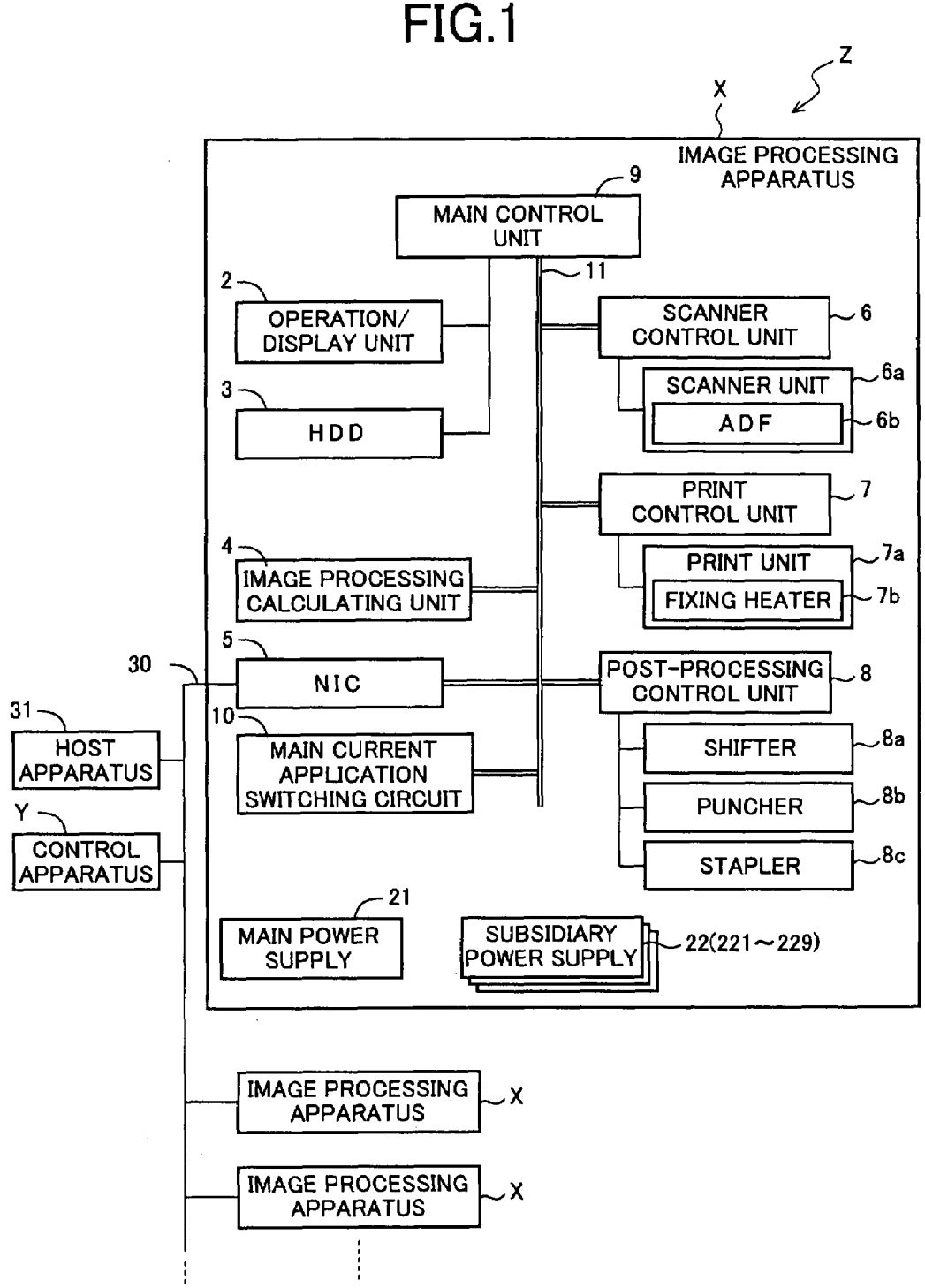
FIG. 1 is a block diagram of schematic configuration of an image processing apparatus X and an image processing system Z having the image processing apparatus X as a constituent element thereof, according to the embodiments of the present invention.

FIG. 1 is a block diagram of schematic configuration of an image processing apparatus X and an image processing system Z having the image processing apparatus X as a constituent element thereof, according to the embodiments of the present invention. Description will firstly be made of the image processing system Z according to the embodiments of the present invention, with reference to the block diagram shown in FIG. 1.

The image processing system Z comprises a plurality of the image processing apparatuses X and a control apparatus Y that is configured to be capable of communicating with each thereof by way of a network 30 and that controls a current application state of each image processing apparatus X. In the example shown in FIG. 1, the network 30 connects also with a host apparatus 31 comprising a personal computer, etc., that transmits a print request or a data filing processing request to the image processing apparatus X.

In this image processing system, the control apparatus Y is equipped with a function of judging whether to apply current to a data processing unit (a part or a group of parts regarding data processing) held by each image processing apparatus X based on a predetermined current application judging rule and a function of transmitting a result of judgment to each image processing apparatus X.

On the other hand, each image processing apparatus X is equipped with a function of switching between application and non-application of current to the data processing unit provided in its own apparatus and a function of, when the result of judgment of whether to apply current to the data processing unit of its own apparatus is received through a network interface card (an example of communicating unit) from the control apparatus Y, controlling the current application state of the data processing unit based on the result of judgment.

Description will then be made of each constituent element of the image processing system Z.
[Image Processing Apparatus X]

The image processing apparatus X is configured to be capable of communicating with the control apparatus Y and external apparatuses such as the host apparatus 31 by way of the network 30 such as a LAN, etc., conforming to, for example, the standard specification IEEE 802.3 and is equipped with the network interface card (hereinafter, NIC) 5 as an example of the communicating unit that performs the communication. The host apparatus 31 comprises, for example, the personal computer, etc.

As shown in FIG. 1, the image processing apparatus X comprises, in addition to the NIC 5, an operation/display unit 2, a hard disk drive (hereinafter, HDD) 3, an image processing calculating unit 4, a scanner control unit 6, a scanner unit 6a, a print control unit 7, a print unit 7a, a post-processing control unit 8, a shifter 8a, a puncher 8b, a stapler 8c, a main control unit 9, a main current application switching circuit 10, a main power supply 21, subsidiary power supplies 22, etc.

The scanner unit 6a is equipped with an automatic document feeder (hereinafter, ADF) 6b, and the print unit 7a is equipped with a fixing heater 7b.

In the example of FIG. 1, the main control unit 9, the image processing calculating unit 4, the NIC 5, the scanner control unit 6, the print control unit 7, the post-processing control unit 8, and the main current application switching circuit 10 are connected to one another by a bus 11.

The operation/display unit 2 comprises an operation input unit for inputting information and a display unit for displaying the information. The operation input unit is composed of, for example, a sheet key, a touch panel provided on the surface of a liquid crystal display apparatus, etc. The display unit is composed of, for example, the liquid crystal display apparatus, a LED lamp, etc. This operation/display unit 2 constitutes a man-machine interface for the user.

The HDD 3 is a large-capacity nonvolatile memory that stores process data as needed at the time of processing of read image data read from a document or print processing of image data. The HDD 3 is also used to save data files transmitted from the host apparatus 31 in response to a request from the host apparatus 31 that can communicate with the image processing apparatus X. A data filing processing hereinafter indicates the processing of saving the data files transmitted from the host apparatus 31 in the HDD 3 and processing of changing the saving locations (data folders) of the saved data files, changing file names, rewriting data, erasing data, etc.

The image processing calculating unit 4 includes a dedicated signal processing circuit or a DSP (Digital Signal Processor), performs various types of image processing of image data, generates print data (such as image data and print job) used in image formation, generates image data (e.g., image data encoded in a predetermined format such as a JPEG format) to be transmitted to the host apparatus 31, and performs processing of encrypting the image data, decrypting the encrypted image data, compressing and encoding the image data, or decompressing (restoring) the compressed and encoded image data.

The scanner control unit 6 outputs a control signal to the scanner unit 6a and the ADF 6b that perform processing of reading an image from a document to control the scanner unit 6a and the ADF 6b.

The scanner unit 6a is a device that reads an image formed on a document from a document placed on a glass document platen not shown or a document conveyed by the ADF 6b. The scanner unit 6a is disposed with, for example, a light source that applies light to the image surface of the document and a mirror that reflects the reflected light from the document to a predetermined direction, in addition to the ADF 6b, and includes a movable optical unit configured to move along the document, a motor (an example of a driving unit) that drives the movable optical unit, a fixed mirror that guides the light emitted from the movable optical unit along a predetermined path, a lens that focuses the light, a CCD (Charge Coupled Device) that performs photoelectric conversion of the light having passed through the lens to output an electric signal corresponding to the amount of the light (i.e., light reflected by the image surface of the document), etc. When reading an image from the document placed on the document platen, the movable optical unit moves along the document and applies light to the image surface. On the other hand, when reading an image from the document conveyed by the ADF 6b, the movable optical unit is fixed to a predetermined position facing to the conveying path of the document and applies light to the document being conveyed. The electric signal output from the CCD is transmitted as image data to the image processing calculating unit 4.

The ADF 6b is a device that conveys documents set in a document supply tray one-by-one along a predetermined conveying path to discharge the documents to a document discharge tray. The ADF 6b includes a paper feeding roller that sends documents from the document supply tray one-by-one to the document conveying path, a document conveying roller that conveys the documents through the document conveying path, and a motor that drives the rollers, for example.

The print control unit 7 outputs a control signal to the print unit 7a that performs processing relating to the image forming processing to control the print unit 7a.

The print unit 7a sequentially sends recording paper sheets contained in a paper feeding cassette not shown one-by-one to convey the recording paper sheets through a predetermined image forming position to a paper discharging tray and forms (outputs) images on the recording paper sheets at the image forming position based on the document image data read by the scanner unit 6a from the document, print data generated by the image processing calculating unit 4, etc. The image processing apparatus X functions as a copier by performing an image forming processing based on the document image data and functions as a printer by performing an image forming processing based on a print request (print job) received from the host apparatus 31.

The print unit 7a includes a photoconductor drum that carries an image, a charging device that charges the photoconductor drum, an exposing device that writes an electrostatic latent image onto the photoconductor drum surface based on the given image data or print job, a developing device that develops the electrostatic latent image to a toner image, a transferring device that transfers the toner image on the photoconductor drum to the recording paper sheet, and a motor that drives the photoconductor drum and rollers for conveying the recording paper sheet, for example.

The print unit 7a also includes a fixing device that heats and fixes the toner image transferred to the recording paper sheet, and the fixing device includes a heating roller including a fixing heater 7b therein, a pressing roller that presses the recording paper sheet with the transferred toner image against the heating roller, a motor that drives the rollers, etc.

The post-processing control unit 8 outputs a control signal to the shifter 8a, the puncher 8b, and the stapler 8c that perform various types of post-processing for the recording paper sheet after the image formation to control the shifter 8a, the puncher 8b, and the stapler 8c.

The shifter 8a includes a movable tray disposed with a plurality of paper discharging trays and sorts the recording paper sheets in accordance with a predefined rule when the print unit 7a sequentially performs the image forming processing of a plurality of sets of sheets for a group of image data or print jobs (hereinafter, a set of jobs). The movable tray can shift positions of the paper discharging trays relative to a recording paper discharging port.

For example, the shifter 8a controls the movable tray such that the recording paper sheets after the image formation are discharged to each paper discharging tray for each set of jobs or each of the same pages. The puncher 8b performs processing of forming punch holes in the recording paper sheets after the image formation. The stapler 8c performs staple binding processing for a plurality of the recording paper sheets after the image formation. The shifter 8a, the puncher 8b, and the stapler 8c are hereinafter collectively referred to as post-processing executing units.

With regard to the scanner control unit 6, the print control unit 7, and the post-processing control unit 8 that respectively control the scanner unit 6a, the print unit 7a, and the post-processing executing units 8a to 8c that directly perform each type of individual processing of the image reading process, the image forming process, and the post-processing for the recording paper sheets, these control units are hereinafter generally referred to as local control units.

The NIC 5 is a communication interface that transmits/receives data to/from the host apparatus 31 through the network 30 such as LAN compliant with the IEEE 802.3 standard, for example. The NIC 5 performs processing of transmitting to the host apparatus 31 the image data generated by the image processing calculating unit 4, the image data read by the scanner unit 6a, or the data saved in the HDD 3, for example, processing of receiving various data processing requests from the host apparatus 31, etc. The data processing requests include a print request (so-called print job) that requests to form an image on recording paper, a scan request that requests to read an image from a document, a data filing request that requests to perform the data filing processing.

The main power supply 21 and the subsidiary power supplies 22 are power supply circuits supplying electric power to the constituent elements of the image processing apparatus X.

As described later, the main current application switching circuit 10 is a switch circuit that switches between connecting and disconnecting the subsidiary power supplies to and from a commercial power supply in accordance with a control signal received from the NIC 5 to switch between application and non-application of current to some devices such as the main control unit. Details thereof are described later.

The main control unit 9 controls each of the operation/display unit 2, the HDD 3, and the image processing calculating unit 4 and gives/receives to/from each of the scanner control unit 6a, the print control unit 7, and the post-processing control unit 8 the information necessary for the data processing performed by each of the control units and the information acquired from the data processing.

For example, the main control unit 9 delivers to the print control unit 7 the information such as a size of a recording paper sheet where an image will be formed, a magnification ratio and a density correction value of the output image, and whether color image forming processing or monochrome image forming processing is performed, while the main control unit 9 acquires from the print control unit 7 the information about how many recording paper sheets are completed in the image formation, the information about errors generated in the print unit 7a, etc. The main control unit 9 delivers to the scanner control unit 6 the information of an image reading range in a document, etc., while the main control unit 9 acquires from the scanner control unit 6 the information about how many documents are completed using the ADF 6b in the image reading, the image data read by the scanner unit 6a, the information about errors generated in the ADF 6b, etc. The main control unit 9 delivers to the post-processing control unit 8 information about the kind of the sorting processing by the shifter 8a, information about the number of recording paper sheets subjected to the punching processing and the staple binding processing by the puncher 8b and the stapler 8c, etc., while the main control unit 9 acquires from the post-processing control unit 8 the information about errors generated in the shifter Ba, the puncher 8b, and the stapler 8c.

As described above, the main control unit 9, the HDD 3, the scanner control unit 6, the scanner unit 6a, the print control unit 7, the print unit 7a, the post-processing control unit 8, and the post-processing executing units 8a to 8c are functional blocks, each of which is configured as a part or a group of parts sectionalized in accordance with the functions. These plural functional blocks as a whole constitute the data processing unit that executes various kinds of data processing (scanner processing, print processing, post-processing and data filing processing).

[NIC5 of Image Processing Apparatus X]

Figure 2:
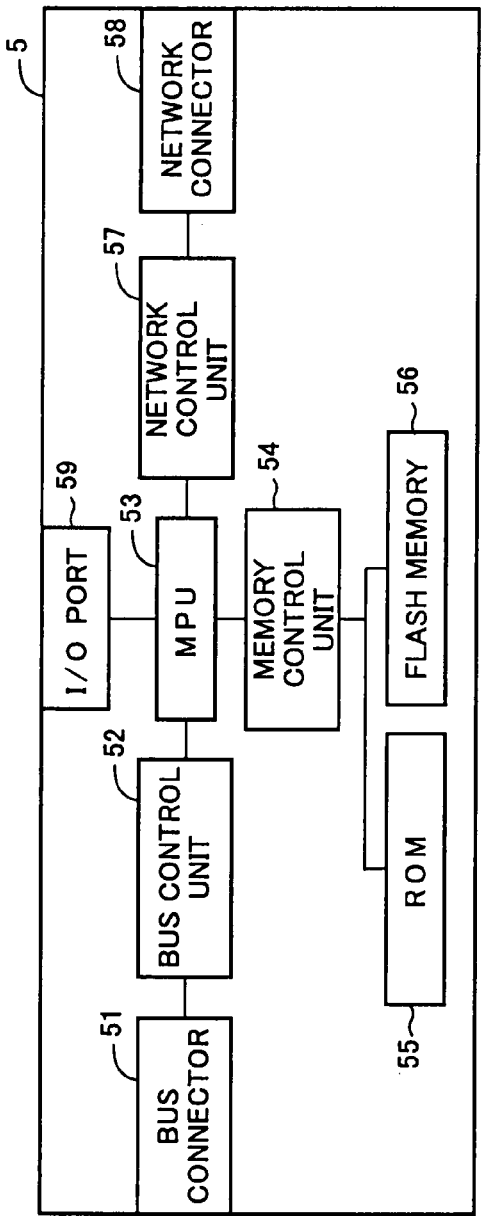
FIG. 2 is a block diagram of schematic configuration of a NIC held by the image processing apparatus X.

FIG. 2 is a block diagram of schematic configuration of the NIC held by the image processing apparatus X. Description will be made of the configuration of the NIC 5 with reference to the block diagram of FIG. 2.

The NIC 5 comprises a bus connector 51, a bus control unit 52, an MPU 53, a memory control unit 54, a ROM 55, a flash memory 56, a network control unit 57, a network connector 58, an I/O port 59, etc.

The bus connector 51 is a connector for connection to the bus 11 and the bus control unit 52 is for transmission of signals to or from other devices by way of the bus 11.

The network connector 58 is a connector for physical connection with the network 30. The network control unit 57 performs communication control conforming to a predetermined network protocol, for example, the standard specification IEEE 802.3, the TCP/IP, etc.

The I/O port 59 is connected to an operation detecting switch 1 to be described later and is an interface relaying the signal transmission between the operation detecting switch 1 and the MPU 53.

The MPU 53 is a calculating unit of performing various kinds of processing such as the processing of relaying the signal transmission between the bus 11 and the network 30 and the processing of responding when predetermined processing is requested from the host apparatus 31 by way of the network 30, by executing a program stored in advance in the ROM 55. The program to be executed is deployed to a RAM not shown, built in the MPU 53, for execution. The MPU 53 makes access to the ROM 55 and the flash memory 56 by way of the memory control unit 54.

[Control Apparatus Y]

Figure 3:
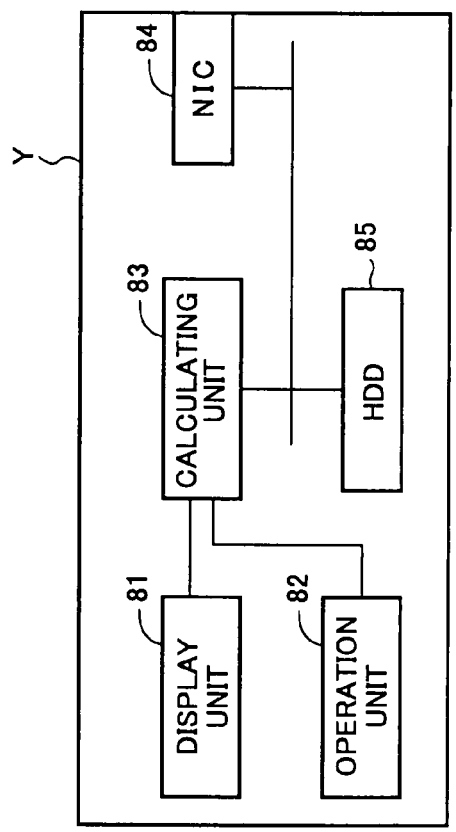
FIG. 3 is a block diagram of schematic configuration of a control apparatus Y that is a constituent element of the image processing system Z.

FIG. 3 is a block diagram of schematic configuration of the control apparatus Y that is a constituent element of the image processing system Z. Description will be made of the configuration of the control apparatus Y, with reference to the block diagram of FIG. 3.

The control apparatus Y is a general computer and comprises a display unit 81 composed of a liquid crystal display, etc.; an operation unit 82 as an information input unit composed of a keyboard, a mouse, etc.; a calculating unit 83 that is composed of an MPU and peripheral devices thereof (such as a ROM and a RAM) and performs various kinds of calculations; a network interface card (NIC) 84 as a communicating unit of communicating with each of the image processing apparatuses X by way of the network 30; a hard disk drive (hereinafter, HDD) 85 as a storing unit of storing a program to be executed by the calculating unit 83 and various kinds of data to be referred to by the calculating unit 83, etc.

The control apparatus Y performs various kinds of processing to be described later, by execution of a predetermined program stored in advance in the HDD 85 by the calculating unit 83.

[Power Supply System]

Figure 4:
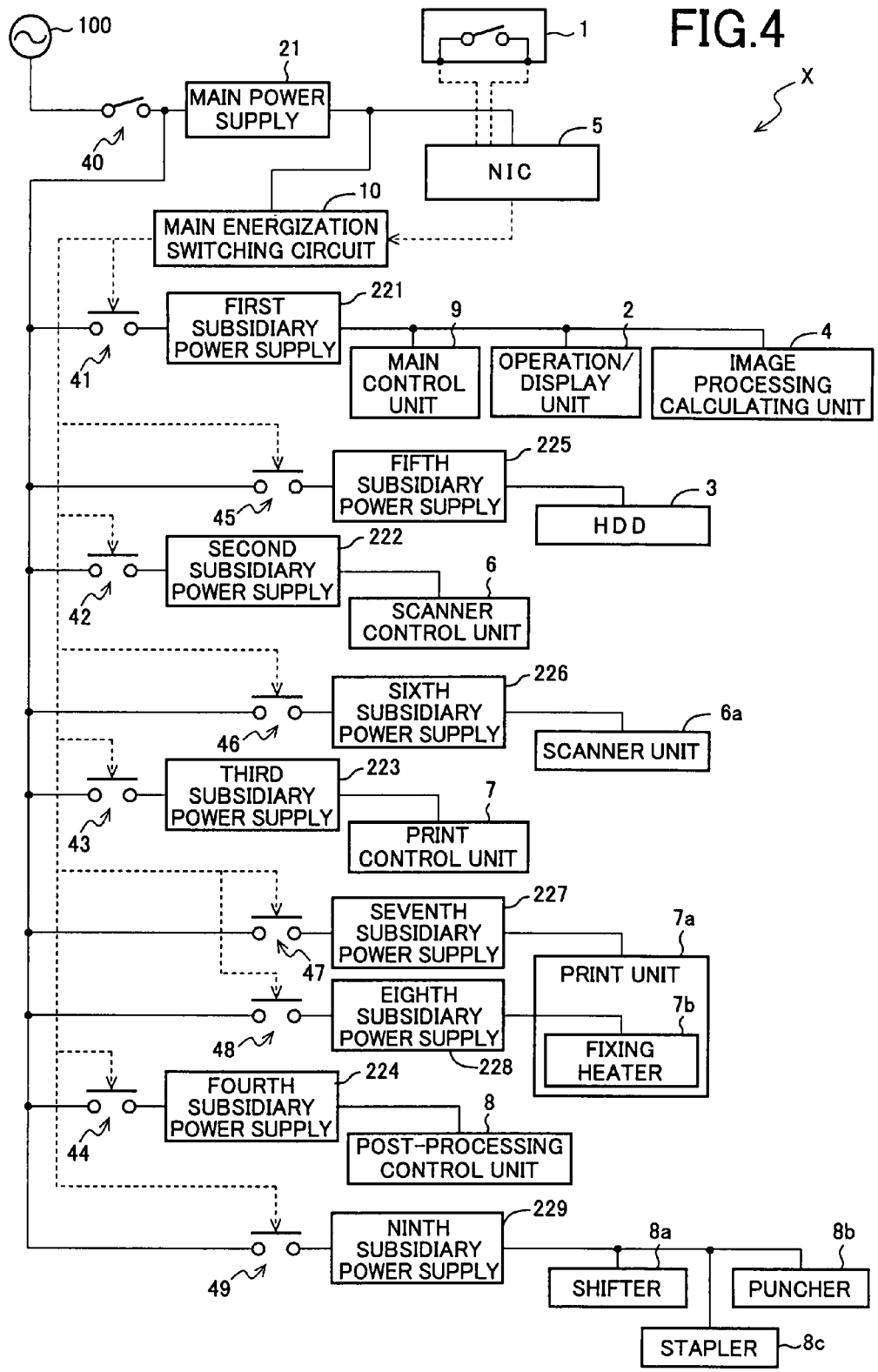
FIG. 4 is a power supply system diagram of an example of connection of a power supply in the image processing apparatus X.

FIG. 4 is a power supply system diagram of an example of connection of a power supply in the image processing apparatus X. Description will be made of the example of the connection of the power supply to each functional block of the image processing apparatus X, with reference to the power supply system diagram of FIG. 4.

In FIG. 4, a power supply line is indicated by a solid line and other signal transmission line is indicated by a broken line.

In the example of FIG. 4, the image processing apparatus X is equipped with the main power supply 21 and nine subsidiary power supplies 22 (hereinafter, first subsidiary power supply 221 to ninth subsidiary power supply 229).

The main power supply 21 is a power supply for supplying power to the NIC 5 and the main current application switching circuit 10.

The main power supply 21 is connected to a commercial power supply 100 that is a basic power source to the image processing apparatus X as a whole by way of a manual switch 40 for manually switching between conducting or shutting off of the power supply line according to manual operation. By the operation of switching of this manual switch 40 by the user, switching is made between application or non-application of current to the NIC 5 and the main current application switching circuit 10. Therefore, in the state where the image processing apparatus X is connected to the commercial power supply 100, the NIC 5 and the main current application switching circuit 10 are constantly in the current-applied state unless the manual switch 40 is switched from the conducting state to the shut-off state by the user's operation. When the manual switch 40 is switched to the shut-off state, the image processing apparatus X as a whole is put in the non-current-applied state (stop state).

On the other hand, the first subsidiary power supply 221 is a power supply circuit that supplies power to the main control unit 9, the operation/display unit 2 and image processing calculating unit 4.

The second subsidiary power supply 222, the third subsidiary power supply 223 and the fourth subsidiary power supply 224 are power supply circuits that supply power to the scanner control unit 6, the print control unit 7 and the post-processing control unit 8, respectively.

The fifth subsidiary power supply 225, the sixth subsidiary power supply 226 and the ninth subsidiary power supply 229 are power supply circuits that supply power to the HDD 3, the scanner unit 6a and the post-processing executing units 8a to 8c, respectively.

The seventh subsidiary power supply 227 is a power supply circuit that supplies power to the devices of the print unit 7a except the fixing heater 7b, and the eighth subsidiary power supply 228 is a power supply circuit that supplies power to the fixing heater 7b.

The first subsidiary power supply 221 to the ninth subsidiary power supply 229 are connected to the commercial power supply 100 through the manual switch 40 and automatic switches 41 to 49 that switch between conducting or shutting off of the power supply line based on predetermined control signals. As is clear from FIG. 4, correlations exist between the automatic switch 41 and the first subsidiary power supply 221, between the automatic switch 42 and the second subsidiary power supply 222, . . . , and between the automatic switch 49 and the ninth subsidiary power supply 229.

Therefore, the subsidiary power supplies 221 to 229 become the current-applied state only when the automatic switches 41 to 49 become the conducting state if the manual switch 40 has been the conducting state.

Conducting and shutting off the power supply line are hereinafter referred to as turning ON and turning OFF, respectively. Similarly, a state where the power supply line is conducted and a state where it is shut off are referred to as an ON state and OFF state, respectively.

The automatic switch 41 to 49 function as a current application switching device that becomes the ON state or OFF state to switch between application and non application of current individually to each functional block 6 to 10, 6a, 7a, 8a to 8c.

Hereinafter, in the image processing apparatus X, the state in which the NIC 5 is in the current-applied state (the manual switch 40 is in the conducting state) and the data processing unit as a whole (all functional blocks 6 to 10, 6a, 7a, 8a to 8c) is in the non-current-applied state (all of the automatic switches 41 to 49 are in the OFF state) is referred to as a sleep mode. On the other hand, the state in which the NIC 5 and the data processing unit as a whole (all functional blocks 6 to 10, 6a, 7a, 8a to 8c) are in the current-applied state is referred to as a operating mode.

The image processing apparatus X has an operation detecting switch 1 that switches between the ON state and the OFF state according to the operation by the user. The ON/OFF state of this operation detecting switch 1 is detected by the NIC 5. Specifically, the operation detecting switch 1 is connected to the I/O port 59 of the NIC 5 and the MPU 53 of the NIC 5 detects through this I/O port 59 the ON/OFF state of the operation detecting switch 1.

This operation detecting switch 1 functions as a current application switch for switching between the operating mode and the sleep mode of the image processing apparatus X.

However, as described below, with respect to the switching from the sleep mode to the operating mode, the operation detecting switch 1 only triggers such switching and whether or not to actually shift to the operating mode (whether or not to apply current to the data processing unit) is judged by the control apparatus Y.

On the other hand, when, while in the operating mode, the operation detecting switch is switched to the OFF state, the MPU 53 of the NIC 5, unless in the process of executing some data processing, turns OFF all automatic switches 41 to 49 and shifts the image processing apparatus X to the sleep mode by controlling the main current application switching circuit 10.

As seen above, the NIC 5, by controlling the ON/OFF of all automatic switches 41 to 49 through the main current application switching circuit 10, individually controls the current application to each functional block. Namely, the NIC 5 serves also as (all of) the device of executing the current application control to each functional block (data processing unit). Additionally, it is also conceivable to so arrange that, for example, the NIC 5 controls the current application to the main control unit 9, and the main control unit 9 controls the current application to other functional blocks. In this case, the NIC 5 serves also as a part of the device of executing the current application control to each functional block (data processing unit).

As described above, in this image processing system Z, the control apparatus Y is equipped with the function of judging whether to apply current to the data processing unit (functional blocks 6 to 10, 6a, 7a, 8a to 8c) held by each image processing apparatus X based on the predetermined current application judging rule and the function of transmitting the result of judgment to each image processing apparatus X.

Figure 8:
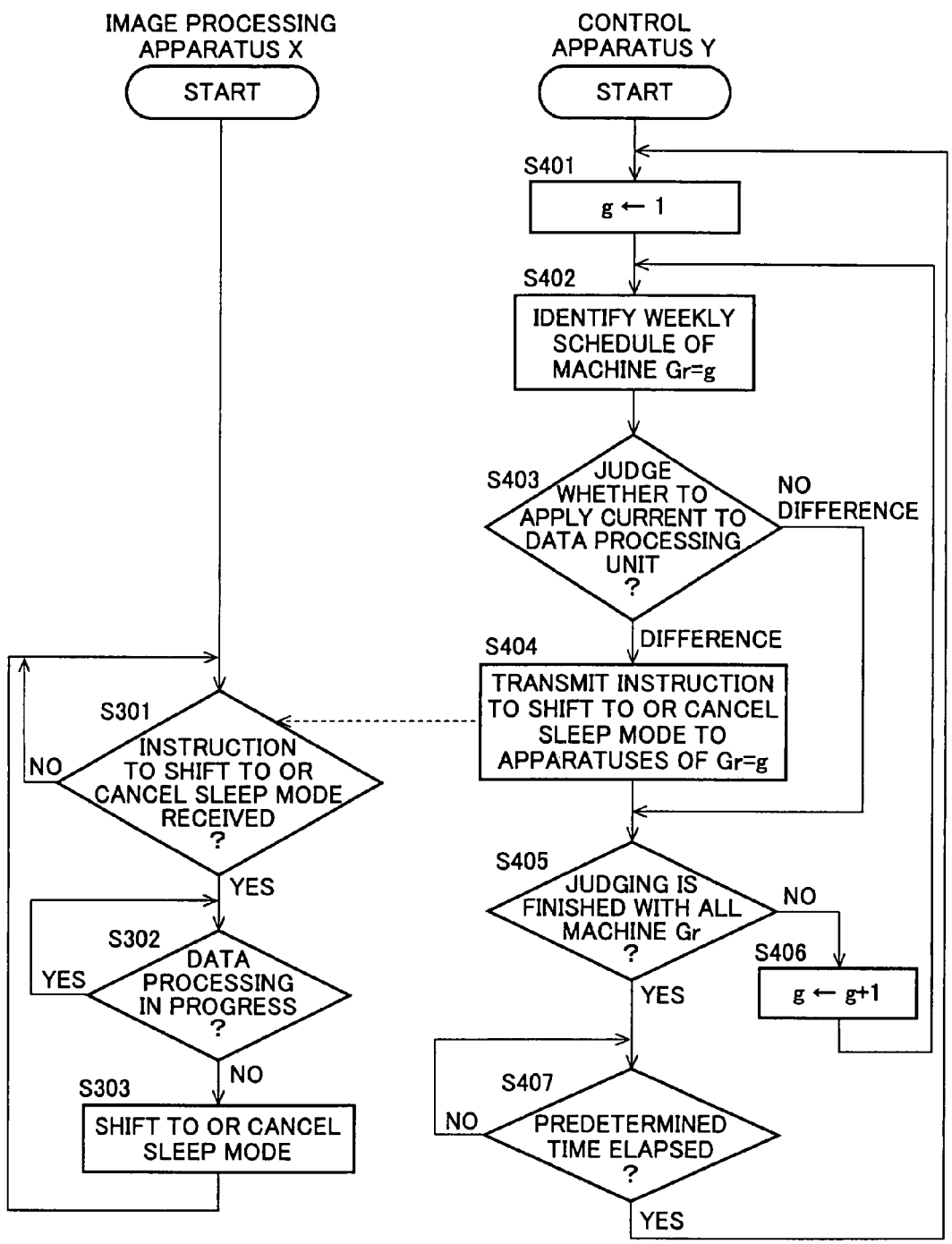
FIG. 8 is a flow chart of a procedure of control apparatus-led current application judging control processing in the image processing system Z.

The control apparatus Y executes the following two kinds ((1) and (2)) of processing as the processing of judging whether to apply current to each image processing apparatus X and transmitting the result of judgment:

(1) processing of judging whether to apply current to the data processing unit of each image processing apparatus X and transmitting the result of judgment, autonomously, in the control apparatus Y. This processing is hereinafter referred to as control apparatus-led current application judging control processing, and a procedure thereof is shown in FIG. 8.

(2) processing of judging whether to apply current with respect to the image processing apparatus X and transmitting the result of judgment when the request for judging whether to apply current to the data processing unit held by each image processing apparatus X is received from the image processing apparatus X. This processing is hereinafter referred to as image processing apparatus-led current application judging control processing, and a procedure thereof is shown in FIG. 5.

Description will firstly be made of the procedure of the image processing apparatus-led current application judging control processing, with reference to a flow chart of FIG. 5. This processing is executed when the image processing apparatus X is in the sleep mode. The following processing to be performed by the NIC 5 of the image processing apparatus X is performed by executing a predetermined program by the MPU 53 of the NIC 5. The following processing to be performed by the control apparatus Y is performed by executing a predetermined program by the calculating unit 83 of the control apparatus Y. S101, S102, . . . shown below represent identification numerals of the processing procedure (step).

[Steps S101 and S102]

Firstly, in the image processing apparatus X in the sleep mode, the NIC 5 monitors the state of the operation detecting switch 1 to judge whether the switch is turned ON (S101) and performs signal reception processing from the host apparatus 31 to judge whether a data processing request is received (S102). The processing of step S102 is processing of receiving a request to start the data processing unit from the host apparatus 31 (an example of external apparatus) through the NIC 5.

Here, it is assumed that kinds of the data processing request to be received from the host apparatus 31, namely, kinds of data processing to be executed by the data processing unit, are scan processing, print processing, print & post-processing, and data filing processing.

The print processing is the processing of forming an image on recording paper. The scan processing is the processing of reading the image from a document. The print & post-processing is the processing of forming the image on the recording paper and at the same time, applying post-processing (one or more of punching processing, stapling processing, and sorting processing) to the recording paper after the image formation. The data filing processing is the processing of accessing the HDD 3 of the image processing apparatus X to operate a data file (writing, updating, reading out, erasing, etc.).

The data processing request calling for each type of these data processing includes at its header portion a user ID identifying the user who requests execution of the data processing (namely, the user who requests the starting of the data processing unit) and processing kind information indicating the kind of the data processing (the kind of the data processing to be executed by the data processing unit). It may be so arranged that identifying information (such as IP address) of the host apparatus 31 that has transmitted the data processing request is used as the user identifying information.

[Step S103]

Upon receipt of the data processing request (request to start the data processing unit) while in the sleep mode (when the data processing unit is in the non-current-applied state), the NIC 5 of the image processing apparatus X transmits to the control apparatus Y a request for judging whether to apply current to the data processing unit (hereinafter, judging request) (S103; an example of the current application judging requesting unit).

This judging request includes the header portion of the data processing request received from the host apparatus 31 (that includes the user ID and the processing kind information indicating the kind of the data processing) and identifying information (for example, IP address) of the image processing apparatus X that has transmitted the judging request.

The identifying information (such as IP address) of the image processing apparatus X is stored in advance in the flash memory 56 (an example of the self identifying information storing unit) of the NIC 5.

The NIC 5 that performs the processing of step S102 is an example of the user identifying information acquiring unit of acquiring identifying information (user ID) of a user who requests the starting of the data processing unit by receiving the data processing request including a user ID at its header portion.

[Steps S201 to S203]

On the other hand, the control apparatus Y monitors to see if the judging request is received from each of the image processing apparatuses X (S201) and, if the judging request is received from any image processing apparatus X, the control apparatus Y identifies to which of a predetermined plurality of machine groups (hereinafter, machine Gr) the image processing apparatus X that has transmitted the request belongs (S202).

The machine Gr means one of a plurality of units (groups) into which a plurality of image processing apparatuses X with the current application thereto being controlled by the control apparatus Y are divided. The HDD 85 of the control apparatus Y stores in advance machine Gr information indicating the correspondence between the IP address assigned to each image processing apparatus X and the machine Gr. The control apparatus Y identifies the machine Gr to which the image processing apparatus X that has transmitted the judging request belongs, based on the IP address of the image processing apparatus X included in the judging request and the machine Gr information.

Likewise, the control apparatus Y identifies the authority of the user who has requested the data processing to the image processing apparatus X that has transmitted the judging request.

The HDD 85 of the control apparatus Y stores in advance user authority information indicating the correspondence between the user ID (identifying information) assigned to each user and the user authority. The control apparatus Y identifies the authority of the user who has requested the data processing based on the user ID included in the judging request and the user authority information.

However, as described later, if the user ID included in the judging request is "pending", then the control apparatus Y skips the processing of this step S203.

[Step S204]

Next, the control apparatus Y identifies weekly schedule information WS corresponding to a combination of the machine Gr and the user authority identified in step S202 and step S203, respectively and the kind of data processing included in the judging request (S204).

The weekly schedule information WS is the information representing the judging rule for judging whether to apply current to the data processing unit of the image processing apparatus X.

FIG. 6 is a schematic view of contents of the weekly schedule information WS. Each box in FIG. 6 is a time zone defined by the day of the week (Monday to Sunday) and the time (00 hours to 23 hours). Space in the box indicates the time zone during which the current application is not permitted and "*" mark in the box indicates the time zone during which the current application is permitted. The control apparatus Y judges whether to apply current depending on the current application permission/no-permission information (presence or absence of the "*" mark) set in the time zone to which the present time belongs in this weekly schedule information WS.

The control apparatus Y has a weekly schedule setting function of enabling the user to set the contents of the weekly schedule information WS as shown in FIG. 6 with the calculating unit 83 controlling the display unit 81 and the operation unit 82. The weekly schedule information set with this weekly schedule setting function is stored in the HDD 85 of the control apparatus Y.

One piece of weekly schedule information WS is set for each of the combinations of the machine Gr, the user authority, and the kind of data processing. Each combination and one weekly schedule information WS are stored in the HDD 85 in a correlated manner. By the processing of steps S202 to S204, the control apparatus Y identifies, out of a plurality of pieces of weekly schedule information WS, one corresponding to the judging request.

Therefore, a plurality of pieces of weekly schedule information WS as a whole constitute information representing a rule for judging whether to apply current to the data processing unit based on the combination of the present time, the identifying information (such as IP address) of each of the image processing apparatuses X, the user ID, the information indicating the kind of data processing.

However, as described later, when the user ID included in the judging request and the kind of data processing are "pending", the control apparatus Y identifies the weekly schedule information WS for the processing pending that is set in advance for each machine Gr.

The rule for judging whether to apply current has the most moderate standard (the standard by which judgment of "current application permitted" is most easily made) in the weekly schedule information WS for the processing pending, as compared with all other pieces of weekly schedule information WS.

As shown above, by so arranging that the weekly schedule information WS can be set according to the user authority identified based on the user ID, the rule for judging whether to apply current can be set in such manner that, for example, a user having a higher level of user authority can have a longer time zone in which the data processing unit can be started than other users do. Of course, by setting different user authority for each different user, different rules for judging whether to apply current can be set for different users.

By so arranging that the weekly schedule information WS can be set according to the machine Gr identified based on the identifying information of the image processing apparatus X, the rule for judging whether to apply current can be set in such manner that, for example, the image processing apparatus X installed in a particular department can have a longer time zone in which the data processing unit can be started than the image processing apparatuses X in other departments do. Of course, by setting a different machine Gr for each different image processing apparatus X, different rules for judging whether to apply current can be set for different image processing apparatuses X.

Likewise, by so arranging that the weekly schedule information WS can be set according to the kind of data processing, the rule for judging whether to apply current can be set in such manner that, for example, the time zone in which the processing can be performed is shortened with respect to the print processing that consumes particularly great power, while the time zone in which the processing can be performed is lengthened with respect to the scan processing or data filing processing that consumes comparatively low power.

[Step S205]

Then, the control apparatus Y judges whether to apply current to the data processing unit with respect to the image processing apparatus X that has transmitted the judging request, based on the weekly schedule information WS identified at step S204 and a processing kind/functional block correspondence table Tb1 stored in advance in the HDD 85 (S205: the calculating unit 83 that performs this processing is an example of the current application judging unit).

In this step S205, firstly, the control apparatus Y judges to which time zone of the weekly schedule information WS the present time belongs and additionally judges whether to apply current to the data processing unit according to the information ("current application permitted" or "current application not permitted") set in such time zone.

Here, the "current application not permitted" indicates that the current application is not permitted with respect to any functional block making up the data processing unit.

On the other hand, when the judgment is "current application permitted", the control apparatus Y further judges which functional block of the data processing unit is to be "current application permitted" according to the kind of data processing. Namely, the control apparatus Y judges whether to apply current, the functional block by the functional block. However, as described later, when the kind of data processing is "pending", the control apparatus Y does not judge whether to apply current, the functional block by functional block. Namely, in the case of judgment of "current application permitted" based on the weekly schedule information WS, it is assumed that the "current application permitted" is applicable to the data processing unit as a whole.

FIG. 7 is a schematic view of data configuration of the processing kind/functional block correspondence table Tb1. This table Tb1 is a data table representing a correspondence between the kind of data processing and the functional block to which current application is permitted. In FIG. 7, "ON" represents the "current application permitted" and "OFF" represents the "current application not permitted". "SC" represents the scan processing, "PR" the print processing, "PR&TR" the print & post-processing, and "DF" the data filing processing. The "pending" indicates that the kind of data processing is not identified.

As shown in FIG. 7, when the kind of data processing is the scan processing (SC), the control apparatus Y judges that "current application permitted" is applicable only to the first subsidiary power supply 221, the second subsidiary power supply 222, the fifth subsidiary power supply 225, and the sixth subsidiary power supply 226 in the image processing apparatus X. Namely, the control apparatus Y judges that "current application permitted" is applicable only to the main control unit related units (the main control unit 9, the operation/display unit 2, and the image processing calculating unit 4), the HDD 3, the scanner control unit 6, and scanner unit 6a.

Likewise, when the kind of data processing is the print processing (PR), the control apparatus Y judges that "current application permitted" is applicable only to the first subsidiary power supply 221, the third subsidiary power supply 223, the fifth subsidiary power supply 225, the seventh subsidiary power supply 227, and the eighth subsidiary power supply 228 in the image processing apparatus X. Namely, the control apparatus Y judges that "current application permitted" is applicable only to the main control unit related units, the HDD 3, the print control unit 7, and the print unit 7a.

Likewise, the control apparatus Y judges that "current application permitted" is applicable only to the functional blocks required for performing the requested data processing, according to the processing kind/functional block correspondence table Tb1 shown in FIG. 7.

[Step S206]

After judging whether to apply current as described above, the control apparatus Y transmits through the NIC 84 the result of judgment to the image processing apparatus X that has transmitted the judging request (S206: an example of judgment result transmitting unit) and thereafter, the process goes back to step S201 described earlier.

By this, the control apparatus Y judges whether to apply current to the data processing unit each time the judging request is received from the image processing apparatus X.

As shown above, when the request for judging whether to apply current to the data processing unit is received from the image processing apparatus X, the calculating unit 83 of the control apparatus Y causes the judging of whether to apply current (S205) and the transmitting of the result of judgment (S206) to be executed (an example of the image processing apparatus-led judging controlling unit).

[Steps S104 to S106]

On the other hand, the NIC 5 of the image processing apparatus X, after the transmission of the judging request (S103), monitors reception of the result of judgment (reply) from the control apparatus Y (S104).

When the result of judgment is received from the control apparatus Y and the result of judgment is "current application permitted", the NIC 5 of the image processing apparatus X controls the main current application switching circuit 10 so that the current is applied only to the subsidiary power supply (namely, functional block) to which "current application permitted" is judged to be applicable (S105: an example of the current application control unit).

Then, the image processing apparatus X, by causing the functional block to which the current is applied to operate, executes the processing according to the data processing request made by the user (S106).

[Steps S116, S117 and S107]

On the other hand, when the result of judgment received from the control apparatus Y is "current application not permitted", the NIC 5 of the image processing apparatus X controls the main current application switching circuit 10 so that the current is applied only to the first subsidiary power supply 221 (S116). By this, the main control unit 9, the operation/display unit 2, and image processing calculating unit 4 are started.

Then, the main control unit 9 causes a display portion of the operation/display unit 2 to display information indicating a notice to the effect that the requested data processing can not be executed (namely, to the effect that a reply is received that informs that the current application to the data processing unit is not permitted) (S117: an example of the current application not permitted notifying unit).

By this, the user who has requested the image processing apparatus X to execute the data processing can confirm that the request has not been granted.

Upon completion of the processing of either step S106 or step S117, the NIC 5 controls the main current application switching circuit 10 so that the image processing apparatus X is shifted to the sleep mode (S107) and then the processing is shifted to step S101.

[Step S111]

Description will then be made of the processing when the ON of the operation detecting switch 1 is detected (S101: Yes) in the image processing apparatus X in the sleep mode.

In this case, the NIC 5 of the image processing apparatus X transmits the judging request to the control apparatus Y (S111). In this case, the NIC 5 transmits the judging request with the user ID and the kind of data processing in "pending" state.

In response, the control apparatus Y executes the processing for the case of the user ID and the kind of data processing being "pending", namely, the processing of steps S201, S202, and S204 to S206 described earlier (S203 skipped)

[Steps S112 to S115]

On the other hand, the NIC 5 of the image processing apparatus X, after transmitting the judging request (S111), monitors the reception of the result of judgment (reply) from the control apparatus Y (S112).

Then, when the result of judgment is received from the control apparatus Y and the result of judgment is "current application not permitted", the NIC 5 of the image processing apparatus X shifts the processing to step S116. By this, the processing of shifting to the notifying processing described above (S116 and S117) is executed.

On the other hand, when the result of judgment received from the control apparatus Y is "current application permitted", the NIC 5 of the image processing apparatus controls the main current application switching circuit 10 so that the current is applied only to the first subsidiary power supply 221 (S113). By this, the main control unit 9, the operation/display unit 2, and the image processing calculating unit 4 are started.

Then, the main control unit 9 of the image processing apparatus X, through the operation/display unit 2, executes the processing of inputting the user ID of the user operating the image processing apparatus X and the information identifying contents of the data processing including the kind of data processing requested (S114). At this step S114, the user inputs the user ID and the contents of the data processing according to an instruction displayed on the operation/display unit 2. Additionally, it is conceivable that the image processing apparatus X is equipped with an IC card reader, a fingerprint reader, etc., and the user information such as the user ID is input through these devices.

The processing at step S114 is the processing of accepting the request to start the data processing unit through the operation/display unit 2 of the image processing apparatus X and at the same time, acquiring the identifying information (user ID) of the user who requests the starting of the data processing unit.

Next, the NIC 5 of the image processing apparatus X transmits the judging request to the control apparatus Y, in the same way as in step S103 (S115: an example of the current application judging requesting unit).

This judging request includes the user ID input at step S114, the kind of data processing based on the contents of the data processing input at step S114, and the identifying information (such as IP address) of the image processing apparatus X that transmits the judging request.

After the processing of this step S115, the NIC 5 of the image processing apparatus X shifts the processing to the step S104 described above. By this, the processing of steps S104 to S107, S116, and S117 are executed in the image processing apparatus X.

Description will then be made of the procedure of the control apparatus-led current application judging control processing, with reference to a flow chart of FIG. 8. This processing is the processing for the control apparatus Y to cause each image processing apparatus X to shift from the operating mode to the sleep mode and from the sleep mode to the operating mode according to a predetermined weekly schedule. It is assumed that the control apparatus Y stores in the HDD 85, etc., the information indicating in what kind of current application state each image processing apparatus X is at each point of time in the course of executing the image processing apparatus-led current application judging control processing described above and the control apparatus-led current application judging control processing to be described below. The control apparatus Y executes the processing of the steps S201 to S206 shown in FIG. 5 and the processing of the steps S401 to S407 shown in FIG. 8, in parallel.

[Steps S401 to S404]

Firstly, the control apparatus Y initializes a variable g representing the number of the machine Gr (g=1) (S401).

Next, the control apparatus Y identifies the weekly schedule information WS of the machine Gr corresponding to the variable g (hereinafter, g-th machine Gr) (S402).

The control apparatus Y stores in advance in the HDD 85 the weekly schedule information WS for each machine Gr to be used for the control apparatus-led current application judging control processing. This weekly schedule information WS as well is the information set by the weekly schedule setting function described above.

Then, the control apparatus Y judges, based on the weekly schedule information WS identified at step S402, whether to apply current to the data processing unit of the image processing apparatus X belonging to the g-th machine Gr, namely, whether to cause the image processing apparatus X to shift from the operating mode to the sleep mode or from the sleep mode to the operating mode (mode shift judging) (S403).

If the result of judgment is different from the current application state (mode) up to the moment of the image processing apparatus X, the control apparatus Y transmits an instruction according to the result of judgment at step S403 to each image processing apparatus X belonging to the g-th machine Gr (S404). Namely, the control apparatus Y transmits an instruction to shift to the sleep mode when the judgment at step S403 is "current application not permitted" and an instruction to cancel the sleep mode (that may be called an instruction to shift to the operating mode) when the judgment at step S403 is "current application permitted".

On the other hand, if the result of judgment at step S403 is not different from the current application state up to the moment of the image processing apparatus X, the control apparatus Y shifts the processing to the step S405 described below.

[Steps S405 to S407]

The control apparatus Y repeats the processing of steps S402 to S404, sequentially counting up the variable g (S406), until it is judged that judging of whether to apply current is finished with all machine Gr (S405).

Furthermore, the control apparatus Y, by providing a predetermined time interval each time the judging of whether to apply current is finished with all machine Gr (S407), repeats the processing of the steps S401 to S406 periodically and sequentially.

As seen above, the control apparatus Y autonomously (rather than responding to the request from the image processing apparatus X) executes the judging of whether to apply current to the data processing unit of each image processing apparatus X (S403) and the transmission of the instruction corresponding to the result of judgment when the result of judgment is different (S404). Described above is an example of the control apparatus-led current application judging control processing.

[Steps S301 to S303]

On the other hand, the NIC 5 of the image processing apparatus X monitors to see if an instruction according to the result of judgment of whether to apply current to the data processing unit is received from the control apparatus Y (S301).

Upon receipt of the instruction from the control apparatus Y, the NIC 5 of the image processing apparatus X controls the main current application switching circuit 10 so that the image processing apparatus X is shifted to the mode according to the instruction (S303), after completion of the data processing when the processing is in progress at the time of reception of the instruction (S302) or immediately in other case. Namely, in the case of receiving the sleep mode shifting instruction while in the operating mode, the NIC 5 controls so that the current application to each of the subsidiary power supplies 221 to 229 is stopped and the image processing apparatus X is shifted to the sleep mode. On the other hand, in the case of receiving the sleep mode canceling instruction while in the sleep mode, the NIC 5 controls so that the current application to each of the subsidiary power supplies 221 to 229 is started (activated) and the image processing apparatus X is shifted to the operating mode.

As seen above, the NIC 5 of the image processing apparatus X, by controlling the main current application switching circuit 10 according to the reception of the instruction (result of judgment) from the control apparatus Y, controls the current application to the data processing unit (an example of the current application controlling unit).

Then, the NIC 5 of the image processing apparatus X repeats the processing of the steps S301 to S303.

The control apparatus-led current application judging control processing described above is the processing of setting the weekly schedule information WS (namely, the rule for judging whether to apply current) by the machine Gr. Other than this, it is conceivable, for example, to set the weekly schedule information WS by the combination of each machine Gr and each predetermined group of functional blocks (functional block group). In this case, control can be executed so that timing of the stopping or starting differs from one group of functional blocks to another. It is conceivable that, for example, the rule for judging whether to apply current is set in such manner that the time zone in which the current application is permitted is shortened with respect to the print control unit 7 and print unit 7a related to the print processing that consumes particularly great power, while the time zone in which the current application is permitted is lengthened with respect to the scanner control unit 6, scanner unit 6a, etc., related to the scan processing that consumes comparatively low power.

As seen above, by employing the image processing system Z, the current application to the data processing unit held by each of a plurality of image processing apparatuses X can collectively be controlled by the control apparatus Y. By this, the power saving control of the plurality of image processing apparatuses X as a whole can be facilitated.

Since the control apparatus Y can collectively judge whether to return to the operating mode from the sleep mode with respect to the plurality of image processing apparatuses X, each image processing apparatus X is not required to keep the main control unit 9, etc., that perform various kinds of judgment in the current-applied state while in the sleep mode. As a result, the power consumption of the plurality of network-connected image processing apparatuses X as a whole can be reduced.

Furthermore, the control apparatus Y can control so that only a minimally required functional block is in the current-applied state out of a plurality of functional blocks held by each image processing apparatus X while each image processing apparatus X is in the sleep mode. By this as well, the power consumption of the image processing apparatus can be reduced.

As seen above, the present invention enables collective control, by the control apparatus, of the current application to the data processing unit (a part that consumes big power in the image processing apparatus) provided in each of a plurality of image processing apparatuses. As a result, the power saving control of the plurality of image processing apparatuses as a whole can be facilitated.

Since the control apparatus can collectively judge whether to return to the operating state from the power saving state with respect to the plurality of image processing apparatuses, each image processing apparatus is not required to keep the calculating unit that perform various kinds of judgment in the current-applied state while in the power saving state. As a result, the power consumption of the plurality of network-connected image processing apparatuses as a whole can be reduced.

Furthermore, the control apparatus can control so that only a minimally required functional block is in the current-applied state out of a plurality of functional blocks held by each image processing apparatus while each image processing apparatus is in the power saving state. By this as well, the power consumption of the image processing apparatus can be reduced.

If the communicating unit of the image processing apparatus is commonly configured as a part or whole of a constituent element of the current application control unit, the number of constituent elements can be further reduced that must be kept in the current-applied state while the image processing apparatus is in the power saving state and the power consumption can be further reduced.

The invention claimed is:

1. An image processing system in which a plurality of image processing apparatuses having power saving functions and a control apparatus that controls a current application control of a plurality of the image processing apparatuses are connected to a network, respectively, wherein each of the image processing apparatuses has a current application switching means that is able to switch a current application for each function block that performs data processing, wherein a current application judging requesting means sends a request for judging whether to apply current for the data processing to the control apparatus upon receiving a request for data processing when it is in sleep mode, the control apparatus sends information of whether to apply current to the image processing apparatus as a response based on schedule information of the image processing apparatus, the image processing apparatus switches the function block for data processing to an energized state when the response approves to apply current, and the image processing apparatus applies current temporally to the function block including a display control unit to display the effect that it is impossible to execute the data processing when the response disapproves to apply current, the request for judging whether to apply current that is sent from the image processing apparatus includes contents of data processing, and the information for approving current application of the information of whether to apply current that is returned from the control apparatus as a response includes information of the function block to which current application is approved.

* * * * *